United States Patent [19]

Goertler et al.

[11] 4,348,655
[45] Sep. 7, 1982

[54] CONTROL CIRCUIT FOR VEHICLE TURN-SIGNAL FLASHER SYSTEMS

[75] Inventors: Horst Goertler, Sachsenheim; Friedrich Hetzel, Muhlacker; Hans Prohaska; Horst Rachner, both of Bietigheim-Bissingen; Wolf Seitter, Marbach; Josef Swoboda, Bietigheim-Bissingen, all of Fed. Rep. of Germany

[73] Assignee: ITT Industries, Inc., New York, N.Y.

[21] Appl. No.: 192,087

[22] Filed: Sep. 29, 1980

[30] Foreign Application Priority Data

Nov. 3, 1979 [DE] Fed. Rep. of Germany ....... 2944526

[51] Int. Cl.³ .................. B60Q 1/38; G08B 5/38; G08B 21/00
[52] U.S. Cl. .................. 340/73; 340/81 R; 340/66; 340/642; 340/661; 340/641; 315/200 A; 331/49
[58] Field of Search .................. 340/73, 72, 66, 67, 340/81 R, 81 F, 82, 331, 332, 641, 642, 649, 650, 657–664; 315/226, 174, 200 A; 331/49

[56] References Cited

U.S. PATENT DOCUMENTS

| | | | |
|---|---|---|---|
| 4,052,682 | 10/1977 | Wilcox | 331/49 |
| 4,105,996 | 8/1978 | Shimizu | 340/81 R |
| 4,173,013 | 10/1979 | Spiteri | 315/200 A |
| 4,207,553 | 6/1980 | Mizuno et al. | 340/81 R |
| 4,227,174 | 10/1980 | Belcher et al. | 340/81 R |

FOREIGN PATENT DOCUMENTS 590716  1/1960  Canada .................. 331/49

*Primary Examiner*—John W. Caldwell, Sr.
*Assistant Examiner*—Donnie Lee Crosland
*Attorney, Agent, or Firm*—James B. Raden; William J. Michals

[57] ABSTRACT

A control circuit for the turn-signal flasher system of an automotive vehicle. The flasher system includes a relay having switch contacts which are serially connected, together with a direction indicator switch, between the vehicle battery and the turn-signal lamps. A measuring or sampling resistor is connected between the battery and the relay contacts. First and second pulse generators are connected between a first voltage indicator and the relay coil, and are selectively gated to interrupt the relay during normal lamp load conditions. The first pulse generator provides a normal mark-to-space ratio whereas the second pulse generator provides a reduced mark-to-space ratio for use during night driving conditions. Third and fourth pulse generators are responsive to corresponding voltage indicators connected to the measuring resistor. The third and fourth generators function to respectively provide different mark-to-space ratios in response to, and indicative of, lamp outage or current-overload conditions.

4 Claims, 1 Drawing Figure

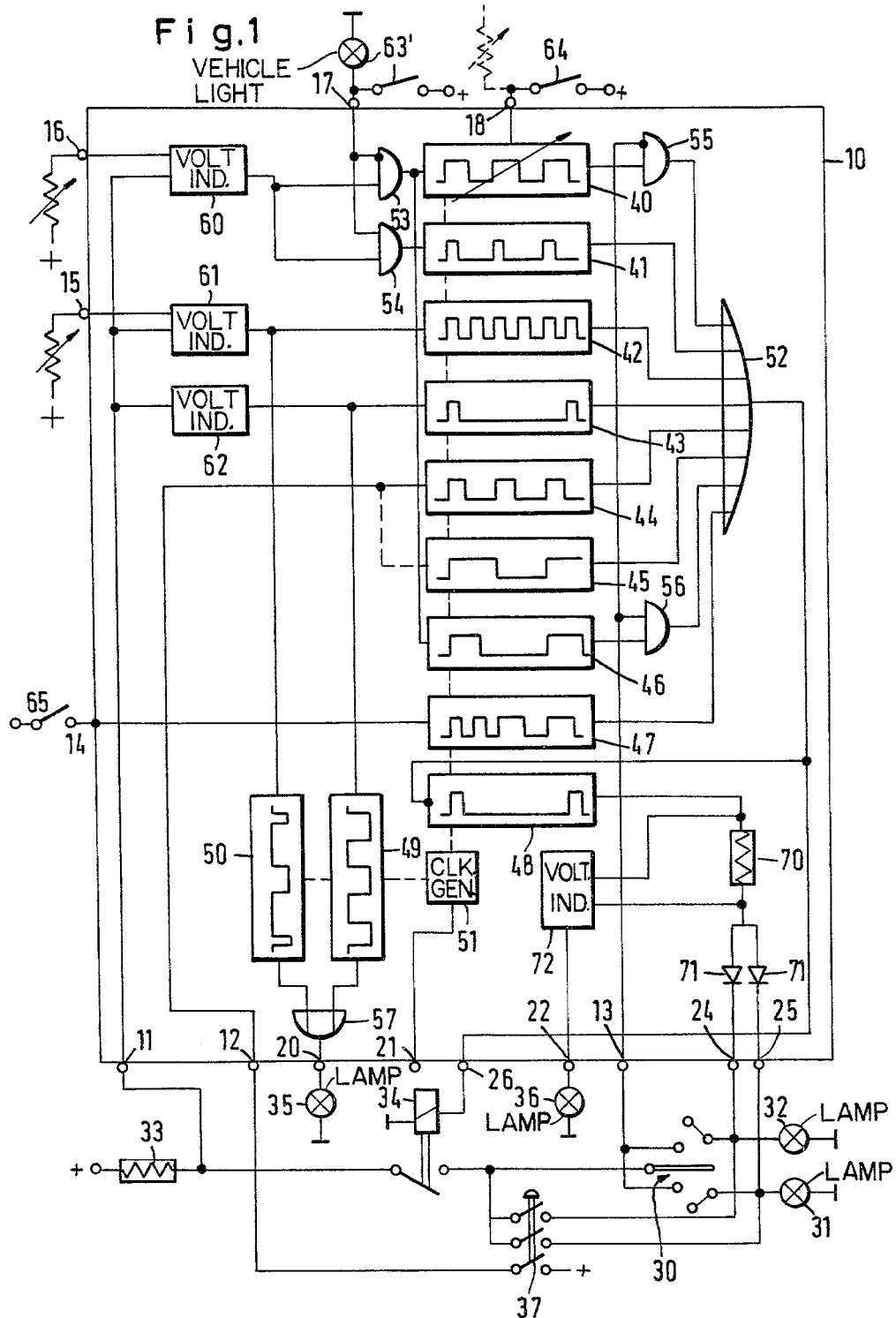

CONTROL CIRCUIT FOR VEHICLE TURN-SIGNAL FLASHER SYSTEMS

The present invention refers to a turn-signal flasher for operating a turn-signal system in motor vehicles, the pulse-shaped output signal of which controls one of two turn-signal lamp circuits when the direction indicator switch is switched on.

At the time being the series-produced turn-signal flashers usually comply with the following functions:

When the direction indicator switch is actuated an output signal with a frequency of approximately 90 pulses per minute is created, whereby the light period, thus the time interval in which the turn-signal lamps are applied to voltage, lasts for about 50 percent of the cycle. Such a flasher signal is easily recognisable in daylight, but the danger of dazzling is not excluded, when it is dark. In order to indicate a faulty turn-signal lamp the frequency of the pulse-shaped output signal is doubled, whereby the mark-to-space ratio remains unchanged. Some turn-signal flashers are also suitable for controlling all turn-signal lamp circuits on the right-hand and left-hand sides of the vehicle upon actuation of the hazard-warning-signal switch. Thereby the output signal corresponds to the direction indicator signal when the turn-signal system is in order. The information to be gained from the flasher signals of known turn-signal systems are no longer sufficient for today's traffic.

Usually the turn-signal lamp circuits are looped into fuses. When the filament lamp is exchanged unproperly or the lamp is destroyed in an accident this fuse will then be destroyed by the short-circuit occurring. Thereby it is a disadvantage that the turn-signal lamp circuit continues to be interrupted, even if the short-circuit current is eliminated. Because not every motorist has a spare fuse on hand and it is also tiresome to change the fuses of some types of vehicles the driving is often continued with defect turn-signal system until the next workshop is reached. Traffic safety is hereby affected too.

Therfore the invention is based on the problem to create a turn-signal flasher for a turn-signal system which does not include the above mentioned disadvantages as a contribution to improve traffic safety.

According to the invention this problem is solved that in dependence on control signal at the input of the turn-signal flasher the mark-to-space ratio is variable, thus the light period of the output signal related to the cycle duration.

By changing the mark-to-space ratio of the output signal now signals can be released with different conditions or operations which can be clearly distinguished. Thus more information is given to the road users than until now as it is desirable in the interest of traffic safety. Due to a reduction of the mark-to-space ratio other raod users are no longer dazzled, when it is dark. As far as turn-signal systems are concerned in which both turn-signal lamp circuits are controlled by the turn-signal flasher, when the hazard-warning signal switch is switched on, by a reduction of the mark-to-space ratio one can reduce the current capability too and thus save energy. With a given capacity of the vehicle battery thus the hazard-warning signal operation can be maintained longer, which fact is as well a contribution to traffic safety.

The proposal for substituting a kind of electronic fuse for the fuses usual until now is also based on the idea of changing the mark-to-space ratio. In an advantageous development of the invention with an extremely high operating current, namely the operating current, the mark-to-space ratio of the output signal is for this purpose reduced in such a way that short pulses are only released at longer time intervals. Thereby the mark-to-space ratio is selected so small that the battery is not excessively loaded by the short-timed current flow and no unduly high heating-up of the current carrying leads to the turn-signal lamps will occur. If now the short-circuit is eliminated and a lower operating current is again detected with the next measuring operation the turn-signal system can immediately take over its normal function.

In the framework of the present invention it has also been thought of increasing the number of possible differing signals by changing the frequency of the pulse-shaped output signal of the turn-signal flasher. Especially the frequency can depend on the driving speed or on the acceleration of the vehicle. Thus the attention of road users can be drawn to a braking operation by an increased frequency of the output signal. Other road users would be able to assess the speed of a vehicle in front or behind by means of the frequency of the output signal. Thus all these measures are a means to the end of increasing the traffic safety.

The invention is described below by way of the embodiment shown in the accompanying drawing. The schematic diagram shown in FIG. 1 thereby is only a means to describe the essential ideas of the invention. The concrete circuitry will differ from this circuit diagram in many respects in practice.

The turn-signal system of a vehicle comprises a turn-signal flasher as a whole designated by 10 with the control inputs 11 to 18 and the outputs 20 to 26, a direction indicator switch 30 through which the turn-signal lamps 31 and 32 may be controlled, a measuring resistor 33, a switching element 34 realised by a relay and two pilot lamps 35 and 36 as well as a hazard-warning-signal switch 37.

The turn-signal flasher includes several pulse generators 40 to 50 which are releasing signals with differing mark-to-space ratios and/or frequencies as this is shown in the drawing. The signals of these pulse generators are derived from the signal of a central clock generator 51 as it is indicated by the dotted connection between clock generator and pulse generators. The signals of the pulse generators 40 to 47 are conducted to an OR-gate 52 which controls the relay 34 via the output 26 of the turn-signal flasher 10. The switch contact of said relay 34 is looped into the turn-signal lamp circuit. When the relay is energised and the direction indicator switch 30 is brought into one of its operating positions one of the turn-signal lamp circuits to the turn-signal lamps 32 or 31 is closed, whereby the operating current flows through the measuring resistor 33.

The pulse generator 40 normally produces a signal with a frequency of 90 pulses per minute and a mark-to-space ratio of 50 percent. This signal is then switched onto the output 26—as it will be described below—a turn-signal flashing is to be indicated, when the filament lamps are not defect.

The pulse generator 41 produces a signal the frequency of which is the same as that of the pulse generator 40, but the mark-to-space ratio is reduced. The light period or the pulse time of the individual pulses is shorter. The signal of said pulse generator 41 is switched onto the output 26, if a turn-signal flashing is to be indicated with a proper turn-signal system, but the brightness of the surrounding falls below a given value.

The pulse generator 42 produces a signal the frequency of which is about twice as high as that of the signal of the pulse generator 40. The mark-to-space ratio amounts to about 50 percent. This signal is switched onto the output 26, when one filament lamp is defect during turn-signal operation.

The pulse generator 43 produces a pulse sequence with a very small mark-to-space ratio. The pulse interval has the duration of a few seconds. This signal is evaluated in case the operating current in the turn-signal lamp circuit assumes an unduely high value.

The pulse generator 44 produces a signal the mark-to-space ratio of which is reduced in comparison to that of the pulse generator 40. This signal is evaluated, when the hazard-warning-signal switch 37 is actuated. Due to the reduced mark-to-space ratio which, however, is to secure a sufficiently recognisable light signal in accordance with the regulations, the current capability during hazard-warning operation is considerably reduced. A similar effect can also be achieved if one reduces the frequency of the output signal during hazard-warning operation, because then fewer cold current surges appear in the turn-signal lamp circuit. By the dotted line between the building blocks 44 and 45 in the circuit diagram it is to be indicated, that here two alternatives are available. But the control of the pulse generator 44 is preferred.

The signal of the pulse generator 46 has another frequency and another mark-to-space ratio than the signal of the pulse generator 40. This signal is to be switched onto the output, when a so-called line change flasher signal is to be realised. The pulse generator 47 is to illustrate that signals with completely predetermined pulse sequences can be used, in which as a matter of fact the frequency and/or the mark-to-space ratio changes during this time.

The turn-signal flasher 10 includes furthermore three voltage indicators 60, 61 and 62 which are all connected to the control input 11, to which the voltage drop at the measuring resistor 33 is conducted. One has to imagine the functioning of these building blocks in such a way that for instance at the output of the voltage indicator 62 a signal is available, when the voltage drop at the measuring resistor 33 assumes an unduely high value. The voltage indicator 62 comprises a store, so that this signal is also retained, when the relay 34 has released again. The other building blocks 61 and 60 are functioning correspondingly, but these building blocks respond to other voltage values. Then the voltage indicator 60 supplies an output signal, when the turn-signal lamp current lies within the normal current range. The threshold value of this voltage indicator 60 is adjustable via the control input 16 of the turn-signal flasher 10, which fact is to be symbolised by the variable resistor. In contrast thereto the voltage indicator 61 is to respond, when at least one of the turn-signal lamps is faulty. The threshold value of this voltage indicator 61 too is adjustable via the control input 15 of the turn-signal flasher 10. The threshold values can be varied in such a way that the turn-signal flasher can be universally used both for tractor vehicles alone and for tractor vehicles with trailer. Thereby the threshold values can be automatically changed when the trailer is coupled.

The output signal of the voltage indicator 60 is conducted to the pulse generator 40 via a gate 53 and to the pulse generator 41 via a gate 54. The two gates are alternatively opened or closed in dependence on a control signal at the control input 17 of the turn-signal flasher 10. This control input is connected to a light switch 63 of the vehicle which also applies power to one or more vehicle lights 63'. When the light switch 63 is switched on the gate 54 is opened and the pulse generator 41 is activated, whereas the pulse generator 40 is activated by the voltage indicator 60, when the lighting system is switched off.

To the outputs of the two pulse generators 40 and 46 gates 55 and 56 follow as well which are affected by a control signal at the input 13 of the turn-signal flasher 10. To this input 13 a control signal is applied, when the direction indicator switch is switched into its first switching position for the so-called lane change flashing. In this case the gate 56 is opened, but the gate 55 is blocked. Upon switching-on of the direction indicator switch 30 the pulse generators 40 to 47 are brought into a condition in a way not shown in detail in which they may be activated by signals at their respective input. Thereby a pulse exciting the relay 34 is released in any case. When all turn-signal lamps are in order the voltage indicator 60 responds and activates the pulse generator 40, when the lighting switch 63 is switched off. If, however, the lighting system is switched on, the pulse generator 41 is activated. Thus the mark-to-space ratio of the output signal is varied at the OR-gate 52 or at the output 26 of the turn-signal flasher 10 in dependence on the control signal at the input 17 of the turn-signal flasher 10, which in the present example means that it is reduced.

If one of the turn-signal lamps is defect, the voltage indicator 60 is reset with the next switching operation of the relay 34 and the voltage indicator 61 is set instead, so that its output signal activates the pulse generator 42. In dependence on the control signal at the input 11 thus the frequency of the output signal is changed now.

If a short-circuit occurs in the turn-signal circuit the voltage indicator 62 is set, whereas the two other voltage indicators are reset. Now the pulse generator 43 is activated and at the output 26 individual pulses may only be measured at longer time intervals. The relay 34 is excited with every pulse for a short time, so that a new measuring operation is started. If the voltage drop at the measuring resistor 33 has changed because the short-circuit has been eliminated, one of the voltage indicators 60 or 61 responds again and the mark-to-space ratio or the frequency of the output signal changes. In this manner it is ensured that the proper flasher operation is automatically put into operation again, when the short-circuit is eliminated.

When the pulse generator 40 is activated, the pulse sequence of the output signal depends on the control signal at the input 18 too. To the control input 18 for instance the brake light switch 64 is connected. The pulse generator 40 can be developed as a voltage-controlled oscillator in such a way that its frequency increases, as soon as the brake light switch 64 is actuated. To the control inputs 18 control signals depending on driving speed or acceleration can be applied too, whereby the frequency of the pulse generator 40 can be varied continuously or also in several steps. The circuit arrangement could be laid out in such a way that at a driving speed between 0 and 60 km/h eighty turn-signal pulses per minute may be measured at the output 26, whereas at a speed between 60 and 120 km/h hundred turn-signal pulses per minute and at a speed higher than 120 km/h one hundred and twenty or more pulses per minute are released. Thus from the flashing signal it can be concluded to the driving speed of the vehicle, so that if required it can be supervised, if a vehicle exceeds the prescribed maximum speed within the boundaries of towns and villages.

When the control signal at the output 18 depends on acceleration the circuit arrangement can be laid out in such a way that starting from a medium flashing frequency the frequency is reduced with positive acceleration and increased with negative acceleration. It would of course be also conceivable that only accelerations or only decelerations are evaluated and correspondingly an increase or reduction of the frequency is provided only.

Upon actuation of the hazard-warning signal switch 37 both turn-signal lamp circuits are controlled simultaneously. Besides a control signal is conducted to the input 12 of the turn-signal flasher 10, so that now either the pulse generator 44 is activated with a reduced mark-to-space ratio or the pulse generator 45 with a reduced frequency. Of course it must be ensured by suitable measures of circuitry, which have not been shown in detail in the drawing, that only the signal of the pulse generator 44 or 45 is switched onto the output.

The mark-to-space ratio furthermore depends on the signal at the control input 13. If the voltage indicator 60 is set, both the pulse generator 40 and the pulse generator 46 are activated. If it is only intended to overtake another vehicle and thus the direction indicator switch 30 is in its first switching position, the lane change signal of the pulse generator 46 is switched through. In the other switching position of the direction indicator switch 30 which is to indicate a driving turn in contrast thereto the signal of the pulse generator 40 is switched through.

The pulse generator 47 is activated by a control signal at the input 14 which can be released by the driver at random via the switch 65. Hereby it is to be illustrated that there is also a possibility that the driver can give any signals and thereby certain information to other road users. For instance it could be imagined that upon actuation of the signal through the pulse generator 47 police cars indicate to other road users driving behind them that they have to follow them.

The pulse generator 48 releases individual pulses at bigger time intervals which are conducted to some or all turn-signal lamp circuits via a measuring resistor 70 and decoupling diodes 71. A voltage indicator 72 with store behaviour evaluates the voltage drop at the measuring resistor 70 and energises the pilot lamp 36, when one of the test circuits is interrupted and therefore no test current flows or too low a test current. The pulse generator 48 has a blocking input which is connected with the output of the OR-gate 52, so that pulses can only be released, when the relay 34 is not excited. Thus the turn-signal lamps 31 and 32 can be checked too, when the direction signal blinker is not activated.

Of course one can provide in well-known manner also a pilot lamp flashing up in accordance with the working cycle of the turn-signal lamps. A further possibility is indicated in the embodiment according to FIG. 1. The pilot lamp 35 is controlled by one of the pulse generators 49 or 50 via an OR-gate 57. The pulse generator 49 is connected to the output of the voltage indicator 62, the pulse generator 50 to the output of the voltage indicator 61. During normal operation the pilot lamp 35 does not flash up. But if a turn-signal lamp is defect and thus the voltage indicator 61 is activated during flasher operation the pilot lamp 35 is controlled via the pulse generator 50. The signal of this pulse generator 50 can be developed in such a way that the mark-to-space ratio changes during that time for the sake of a better distinguishability. If a short-circuit occurs during the flasher operation the voltage indicator 62 is activated and the pilot lamp 35 is controlled via the pulse generator 49 whose output signal differs from that of the pulse generator 50. Thus the driver has the possibility to distinguish the kinds of defects. Thereby it is not necessary that the output signal of the turn-signal flasher is changed too, when a filament lamp is defect. In such a case the pulse generator could still be activated via the voltage indicator 61 and an OR-gate further coupling the output of indicator 61 along with the output of indicator 62 the gate 53, for an indication to a defect turn-signal system cannot be of use to other road users.

In the version shown in the drawing only part of the possible variations are illustrated. Thus it is for instance conceivable to connect a pick-up responding to the brightness of the surrounding of the turn-signal lamps to the control input 17, so that several differing mark-to-space ratios can be adjusted in steps. But it is preferred to change the mark-to-space ratio by means of the light switch 63, because this solution is technically simple and nevertheless meets the requirements.

In order to create signals with differing mark-to-space ratio it is not necessary to provide a separate pulse generator each. It can be imagined instead that only one pulse generator is used whereby, however, in dependence on the control signals individual pulses or pulse sequences are faded out. Thus one could vary the circuit in such a way that via the voltage indicator 62 a timing element is controlled which is triggered with each measuring operation of the turn-signal lamp current and then blocks the pulse generator 40 for a defined time.

In the embodiments shown the control signal at the inputs of the turn-signal flasher 10 depend on the position of certain switches or other pick-ups. Of course the arrangement could be extended in such a way that at the inputs one timing element each follows, so that the mark-to-space ratio and/or the frequency of the output signal also depends on the time the switch is actuated. So it is possible in certain turn-signal systems to release a lane change flashing with a short-time operation of the direction indicator switch developed as a push-button switch, whereby this lane change flashing only lasts for a short time, and to switch on the normal direction indication with a longer operation which is only switched off again, when a switching signal depending on the steering wheel turn is released.

Finally it is furthermore pointed out to the fact that in the present version the direction indicator switch 30 carries the operating current. Of course versions can be imagined too in which two relays are switched by the turn-signal flasher, whereby each relay is assigned to a turn-signal circuit. Then the direction indicator switch can be developed as push-button switch, whereby the turn-signal flasher will include two stores, of which one each is set, when the corresponding of the two push-button switches is actuated and which is reset further expiration of time or by a switching signal depending on the turn of the steering wheel.

In the embodiment all pulse generators are controlled by the central clock generator 51. This is not absolutely necessary, but if such a solution is preferred, the signal at the output of the turn-signal flasher can be used to control further functions in the motor vehicle. At the output 26 a wiper-washer pulse generator for a headlight cleaning installation or a windscreen cleaning installation on the motor vehicle can be controlled through this signal. The pulses can also be used to control the rear window heating installation, especially to switch it off. Besides it is thought of using a pulse of the output signal to control central locking systems in motor vehicles. But this clock generator 51 could finally also be released for the control of clocks or other time circuits, for instance also the clock signal for coding circuits for anti-theft protection of a motor vehicle. The turn-signal flasher building block could also be enlarged in such a way that it includes the complete control circuit for further functions in the motor vehicle. Thereby it is for instance thought of the synchronous control of several wiper motors including a protective circuit for anti-blocking. A short-circuit protection for further consumers could be integrated therein too. Finally also a combination with electronic ignition systems and fuel-injection systems as well as with antiblocking systems is conceivable.

It has additionally to be emphasised that of course the functions and solutions described here must not necessarily be all combined in one turn-signal flasher, but that in accordance with customers' requests a plurality of combinations will be possible. Especially if the turn-signal flasher in its initial stage should be realised by concrete components, individual functions will be preferred at first. In this connection we particularly think of the electronic fuse, thus the function of the pulse generator 43 and the function of the pulse generator 44 for reduction of the current capability in the turn-signal operation. Additionally a control of the brightness will be provided.

In the near future, however, the turn-signal flasher 10 will no longer be realised with concrete components, but one will use integrated circuits instead. For this purpose microprocessor and microcomputer building blocks are suitable which can be produced cheaper and cheaper. In case a sufficient number of pieces will be required it will also be worth-while to produce an integrated circuist according to specifications given by the customer, whereby of course one will attempt to combine this circuit with the switching element, namely the relay, to one constructional unit. Thereby the integrated building block in a ceramic or plastic housing can be directly fastened to a relay. But one can also use semiconductor chips which are not encapsuled and directly attach them at the relay of a printed circuit board. The use of semiconductor chips mounted on a film is conceivable too.

We claim:

1. A control circuit for the turn-signal flasher system of an automotive vehicle and being of the type in which a source of operating current is selectively applied to one of two turn-signal lamps by way of a serially coupled direction indicator switch and in which the current is periodically interrupted by a switching element serially coupled between said source and said lamps, said control circuit comprising:

a measuring resistor serially coupled between said source and said lamps;

a first pulse generator having an input and output wherein said output is coupled to said switching element for interrupting said current;

a second pulse generator having an output coupled to said switching element for interrupting said current and having an input for activating said second pulse generator;

a voltage indicator coupled to said resistor and to said inputs of said first and second pulse generators for activating one of said first and second pulse generators when the voltage drop across said resistor is within a predetermined voltage range corresponding to normal current levels;

gating means coupled between said voltage indicator and the inputs of the pulse generators for selecting one of said first and second pulse generators in response to an external input signal;

a third pulse generator having an output coupled to said switching element for interrupting said current and having an input for activating said third pulse generator;

a second voltage indicator coupled to said measuring resistor and to said input of said third pulse generator for activating said third pulse generator when the voltage drop across said resistor is within a predetermined voltage range corresponding to current levels which are less than said normal current levels;

a fourth pulse generator having an output coupled to said switching element for interrupting said current and having an input for actuating said fourth pulse generator; and, a third voltage indicator coupled to said measuring resistor and to said input of said fourth pulse generator for activating said fourth pulse generator when the voltage drop across said resistor is within a predetermined voltage range corresponding to current levels which are greater than said normal current levels.

2. The control circuit according to claim 1, wherein said first pulse generator is frequency variable and includes a second input coupled to a speed detecting means for varying the frequency of said first pulse generator in accordance with the speed of said vehicle.

3. The control circuit according to claim 1, wherein said input signal is provided by a vehicle light switch whereby said second pulse generator is selected when the vehicle light switch is activated.

4. The control circuit according to claim 3, wherein said switching element is a relay having a coil and a set of contacts with said coil being coupled to said outputs of said pulse generators and said contacts being serially coupled between said source and said lamps.

* * * * *